Feb. 9, 1960 C. J. STARNER 2,924,791

MODULATION SYSTEM FOR TRANSMITTERS

Filed Feb. 25, 1957 2 Sheets-Sheet 1

INVENTOR.
CHARLES J. STARNER

BY G. A. Rechif

ATTORNEY

Feb. 9, 1960 C. J. STARNER 2,924,791

MODULATION SYSTEM FOR TRANSMITTERS

Filed Feb. 25, 1957 2 Sheets-Sheet 2

INVENTOR.
CHARLES J. STARNER
BY
ATTORNEY

United States Patent Office 2,924,791

Patented Feb. 9, 1960

2,924,791

MODULATION SYSTEM FOR TRANSMITTERS

Charles J. Starner, Haddonfield, N.J., assignor to Radio Corporation of America, a corporation of Delaware Application February 25, 1957, Serial No. 642,217

9 Claims. (Cl. 332—48)

This invention relates to a modulation system, and more particularly to a modulation system which has particular utility in amplitude modulated broadcast transmitters.

This invention constitutes an improvement over the so-called "out-phasing" or phase-to-amplitude system of modulation. Such a system operates in the following way. The radio frequency (RF) carriers in two channels (these carriers may be derived from separate sources having the same frequency, or from a single source by way of suitable phase shifting networks) are made to have a predetermined phase difference, such as approximately 135°, for example. Then, the phases of these two carriers are varied or modulated oppositely in accordance with a modulating signal to produce two phase modulated waves which are amplified separately to the desired power and then impressed on a common load so that the RF currents combine vectorially. As the phases of these two carriers are varied, the vectorial resultant output current and the vectorial resultant output power will change accordingly, thus producing amplitude modulation of the power in the load. In fact, the output or load current may vary between zero (when the two RF currents have a relative phase of 180°) and a doubled value, with respect to the unmodulated or "carrier" value (the doubled value being when the two RF currents have a relative phase of 90°). In the latter case, the load power will increase to four times "carrier" power, and this corresponds to the peak of modulation, while the former case corresponds to the trough of modulation.

In an "out-phasing" modulation system as described in the preceding paragraph, it can be shown that the power amplifier or output stage of each channel (the output circuits of both of which are connected to a common load) sees a load which varies over the modulation cycle in accordance with the following equation:

$$Z_L=R_L\left(2\cos^2\frac{\theta}{2}\pm j\sin\theta\right) \qquad (1)$$

where $Z_L$ is the load impedance seen by each channel, $R_L$ is the resistance of the load at "carrier" level of load power, and $\theta$ is the instantaneous phase angle between the RF waves in the two channels. As previously explained, $\theta$ varies from 180° to 90° for a modulation percentage of one hundred, and in general, the "carrier" level is established by setting $\theta$ at approximately 135°. The above equation shows that in addition to the desired resistance variation $$2R_L\cos^2\frac{\theta}{2}$$

there is also introduced a reactive component, caused by the circulating current common to the two power amplifier anode tank circuits. The reactance will be inductive for one channel and capacitive an equal amount for the other channel (hence, the ± sign in the above equation). At the aforementioned $\theta$ of approximately 135°, the anode tank circuits of the power amplifier may be tuned to cancel out the plus or minus (reactive) portion of the load, represented by the "$j$" term in the above equation, and thus present a unity power factor (resistive) load to each output tube. However, as the angle $\theta$ is changed during modulation, the load seen by the output tubes will become a complex impedance and consequently the conversion efficiency will deteriorate from that obtained at "carrier" phase. This lower power factor during modulation is particularly bad on the negative side or trough of the modulation cycle, so bad in fact that it results in excessive plate dissipation in the power amplifier tubes, extremely bad conversion efficiency (essentially zero at the extreme trough of modulation, where the power output is zero), and excessive RF voltage at the power amplifier anodes.

An object of this invention is to improve the phase-to-amplitude modulation system, and to increase the average conversion efficiency thereof materially.

Another object is to provide a novel circuit arrangement for phase-to-amplitude modulation systems, whereby 100% modulation can be achieved without exceeding the plate dissipation rating of the power amplifier tubes.

The objects of this invention are accomplished, briefly, in the following manner: In an "out-phasing" modulation system wherein two RF carriers are modulated oppositely in phase at a low level and then separately amplified before being combined in a common load to provide an amplitude modulated wave, the driving voltage to each of the output or power amplifier tubes is modified in accordance with the output power requirements over the modulation cycle. This modification is effected by amplitude modulating the phase modulated waves applied as driving voltages to the power amplifier inputs, in response to the same modulating signal applied to the phase modulators, the amplitude modulating signal being so phased that the driving voltage modulation peaks coincide with the modulation peaks in the resultant (amplitude modulated) output signal.

A detailed description of the invention follows, taken in conjunction with the accompanying drawings, wherein.

Figure 1:
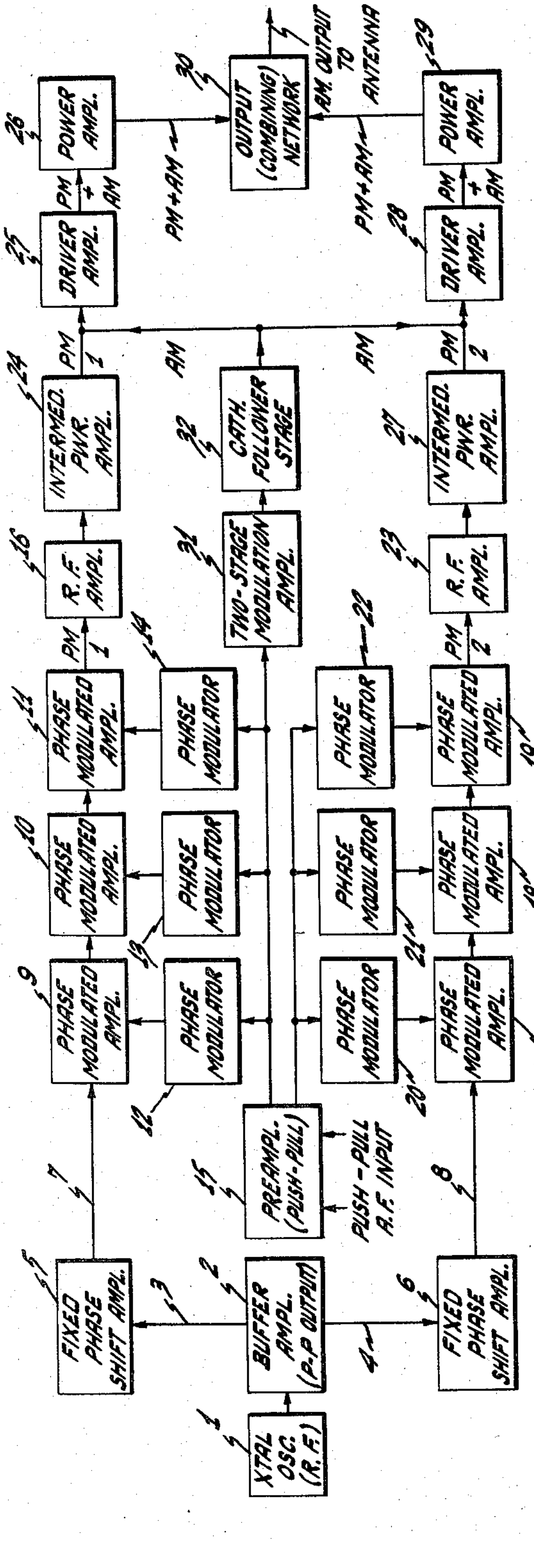
Fig. 1 is a block diagram of the signal portion of a transmitter utilizing the modulation system of this invention.

Referring first to Fig. 1, a single crystal oscillator 1 operating at the desired carrier frequency in the RF range (for example, in the so-called "AM broadcast" range extending from about 500 kc. to about 1600 kc.) feeds carrier wave energy to the input of a buffer amplifier 2 having a push-pull output circuit. Lead 3 is connected to one end of this push-pull output circuit and lead 4 is connected to the opposite end thereof, so that RF waves having a relative phase of 180° appear on leads 3 and 4. Lead 3 feeds one of these waves to the first unit 5 in an independent upper (No. 1) RF channel, while lead 4 feeds the other of these waves to the first unit 6 in an independent lower (No. 2) RF channel. Unit 5, to the input of which lead 3 is connected, is an amplifier which imparts a fixed, predetermined but adjustable phase shift to wave energy passing therethrough. Unit 6, to the input of which lead 4 is connected, is a similar amplifier which imparts a fixed, predetermined but adjustable phase shift to wave energy passing therethrough. Since the phase shifts effected by amplifiers 5 and 6 do not vary with modulation, they may be termed "D.C." shifters.

Figures 2, 3:
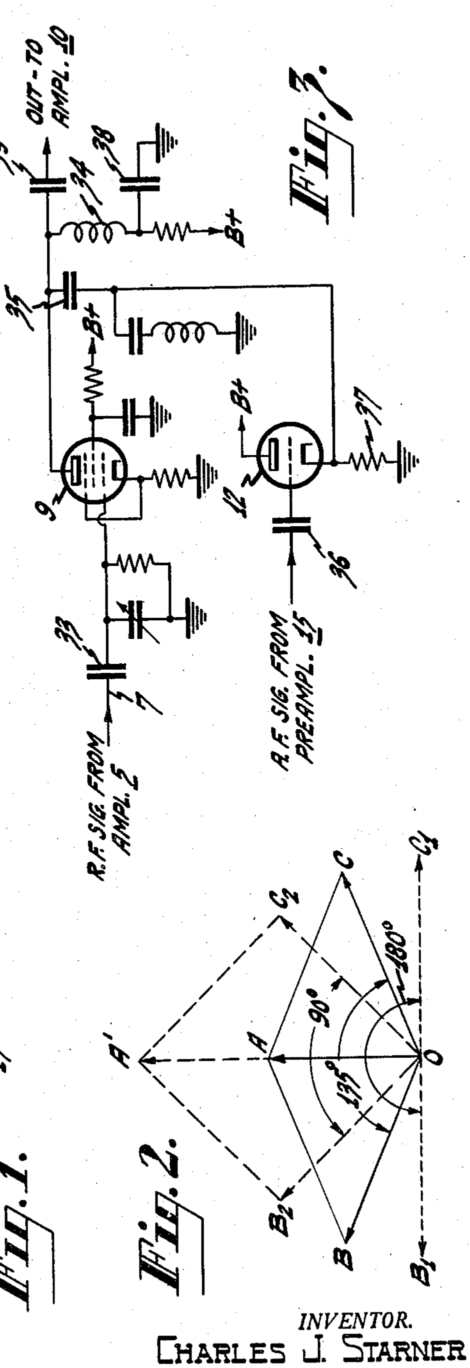
Fig. 2 is a vector diagram useful in explaining the invention.
Fig. 3 is a detailed circuit diagram of one of the phase modulators and phase modulated amplifiers of the Fig. 1 transmitter.

Amplifiers 5 and 6 are initially adjusted so that the RF carrier waves appearing on the respective output leads 7 and 8 thereof differ in phase by approximately 135°. Although for convenience this angle is illustrated in Fig. 2 as being exactly 135°, actually the phase angle between the RF carriers in the two channels is initially made such that when the phase angle between such carriers is varied to 90° the vectorial resultant load current will be doubled as compared to its initial or "carrier" value, and it turns out that the value of this "carrier" angle will be between 138½° and 138¾°, in theory. Actually, however, tube regulation (due to internal impedance effects in the tubes) makes the "peak" phase angle less than 90°, so the "carrier" phase angle would be different from even this theoretical value.

In each of the two channels, the RF carrier (appearing on leads 7 and 8, respectively) may be phase modulated by the audio frequency intelligence at a very low level (in a manner to be described hereinafter), and then amplified by high gain class C amplifiers to the desired power. The high power phase modulated signals in the two channels are then converted to a single vectorial resultant amplitude modulated signal, in a common load.

First assume that the initial carriers are transmitted through the system, without any phase modulation in accordance with audio intelligence. Then, the RF currents from the two RF channels, when impressed on a common load, combine vectorially to produce the so-called "carrier" value of output current. This is illustrated in Fig. 2, wherein the vectorial resultant load current is shown as the solid-line vector OA, with the current from the two RF chains or channels shown as the solid lines OB and OC, these latter two vectors being shown for convenience at a relative phase angle of exactly 135° (however, it will be remembered that in practice this phase angle is only approximately 135°).

It can be seen from Fig. 2 that if modulation is applied so as to shift the phase of OB with respect to OC, the output current and output power will change accordingly. For example, if the phases of OB and OC are changed to the dotted-line positions $OB_1$ and $OC_1$, respectively, the value of load current OA will be reduced to zero and the output power to zero also, corresponding to the trough of modulation for 100% modulation.

Conversely, if the phases of OB and OC are changed to the dashed-line positions $OB_2$ and $OC_2$, respectively, the value of load current OA will increase accordingly. When the phase difference between OB and OC is reduced to 90° (as at $OB_2$ and $OC_2$), it can be seen that the value of load current OA' will double, with respect to "carrier" current, and the power will increase to four times "carrier" power, corresponding to the peak of modulation for 100% modulation. This again is theoretical, and ignores the effects of tube internal impedance and power factor changes, with modulation.

A total phase excursion of approximately ±22.5°, in each of the two channels, is then required for 100% amplitude modulation in the load.

Referring again to Fig. 1, the phase shift amplifiers 5 and 6 are so adjusted that an RF phase difference of approximately 135° exists between the signals on leads 7 and 8. This phase difference represents unmodulated or "carrier" power output. The RF carrier wave in the upper channel (that is, the carrier on lead 7) is phase modulated by passing the same through a series of three cascaded phase modulated amplifiers 9, 10, and 11. Amplifiers 9, 10, and 11 are modulated by means of three phase modulators 12, 13, and 14, respectively, connected thereto; the phase modulators are preferably of the variable resistance type. The phase modulators 12, 13, and 14 are supplied with audio frequency intelligence (modulating signals) by connecting the same in parallel to one of the two push-pull outputs of a preamplifier 15 which operates in push-pull and which is in turn fed from a suitable source of push-pull audio frequency input signals. The audio frequency signals fed to the input of preamplifier 15 may be derived from a microphone or other source. The amplifiers 9, 10, and 11, which produce phase modulation in response to audio frequency modulating signals, may be termed "A.C." shifters.

Each of the phase modulated amplifiers 9, 10, and 11 can impart a phase modulation or phase deviation of approximately ±7.5° to the RF carrier passing therethrough, under 100° modulation conditions; therefore, the signal at the output of amplifier 11 (designated "PM 1"), which is fed to the input of an RF amplifier 16, may have a phase modulation of approximately ±22.5° under conditions of 100% modulation.

Likewise, the RF carrier wave in the lower channel (that is, the carrier on lead 8) is phase modulated by passing the same through a series of three similar cascaded phase modulated amplifiers 17, 18, and 19. Amplifiers 17, 18, and 19 are modulated by means of three phase modulators 20, 21, and 22 respectively connected thereto; the phase modulators 20, 21, and 22 are preferably of the variable resistance type. The phase modualtors 20, 21, and 22 are supplied with audio frequency intelligence (modulating signals) by connecting the same in parallel to the other of the two push-pull outputs of preamplifier 15. The amplifiers 17, 18, and 19, which produce phase modulation in response to audio frequency modulating signals, may also be termed "A.C." shifters.

Each of the phase modulated amplifiers 17, 18, and 19 can impart a phase modulation or phase deviation of approximately ±7.5° to the RF carrier passing therethrough, under 100% modulation conditions; therefore, the signal at the output of amplifier 19 (designated "PM 2"), which is fed to the input of an RF amplifier 23, may have a phase modulation of approximately ±22.5° under conditions of 100% modulation.

Since the modulating signal supplied to modulators 12, 13, and 14 is taken from one of the two push-pull outputs of preamplifier 15 and the modulating signal supplied to modulators 20, 21, and 22 is taken from the other of the push-pull outputs of this preamplifier, it follows that the modulating signal supplied to modulators 12–14 is 180° out of phase with that supplied to modulators 20–22. Therefore, the phase modulation of the carrier wave in the upper channel (brought about through the agency of modulators 12–14) is opposite to that in the lower channel (brought about through the agency of modulators 20–22). To put this another way, referring to Fig. 2, as one current vector OB (representing the RF current at "PM 1" in the upper channel) is made to move in the leading direction from the "carrier" position, the other current vector OC (representing the RF current at "PM 2" in the lower channel) is made to move in the lagging direction from the "carrier" position, and vice versa. Then, assuming 100% modulation, for the positive side of the modulation cycle vector OB rotates clockwise, reaching position $OB_2$ at the peak of the modulation cycle; for this same portion of the modulation cycle, vector OC rotates counterclockwise, reaching position $OC_2$ at the peak of the modulation cycle. For the negative side of the modulation cycle, vector OB rotates counterclockwise, reaching position $OB_1$ at the trough of the modulation cycle; for this same portion of the modulation cycle, vector OC rotates clockwise, reaching position $OC_1$ at the trough of the modulation cycle.

The phase modulated RF signal PM 1 at the output of amplifier 11 in the upper channel is amplified by RF amplifier 16 and is then fed to an intermediate power amplifier 24 for further amplification therein. The amplifiers 16 and 24 preferably operate as class C RF amplifiers. The amplified signal PM 1 at the output of amplifier 24 is applied to the input (grid circuit) of a driver amplifier tube 25 which supplies the driving voltage for a final power amplifier stage 26.

The phase modulated RF signal PM 2 at the output of amplifier 19 in the lower channel is amplified by RF amplifier 23 and is then fed to an intermediate power amplifier 27 for further amplification therein. The amplifiers 23 and 27 preferably operate as class C RF amplifiers. The amplified signal PM 2 at the output of amplifier 27 is applied to the input (grid circuit) of a driver amplifier tube 28 which supplies the driving voltage for a final power amplifier stage 29.

In order to make the vectorial combination illustrated in Fig. 2, that is, to combine vectorially the phase modulated RF currents in the two channels so as to produce amplitude modulated power in the common load, the outputs of power amplifiers 26 and 29 are applied to an output combining network 30. Network 30 comprises a pi-network type of tank circuit for the anode of each of the power amplifier tubes 26 and 29, with a common output shunt element for the two pi networks, so as to combine the outputs of the two tubes vectorially. The output of network 30, which is an amplitude modulated wave, is fed to a suitable load, such as a radiating or transmitting antenna.

The foregoing detailed description discloses a more or less conventional "out-phasing" amplitude modulation system, essentially of the type described by Chiriex in Proceedings of the Institute of Radio Engineers, vol. 23, No. 11, November 1935, pp. 1370–1392.

As previously described, the "carrier" level of load power (the level with no modulation applied to phase modulators 12–14 and 20–22) is established by setting $\theta$ (the angle between the two RF currents) at approximately 135°. At this angle, the anode tank circuits of the power amplifier tubes 26 and 29 are tuned to cancel out the plus or minus reactive portion of the load, thereby presenting a unity power factor (resistive) load to each power amplifier tube. In this connection, reference is made to Equation 1, which sets forth the reactive and resistive portions of the load seen by the power amplifier stage of each channel. The tuning mentioned is accomplished by adjusting the input shunt element of each respective pi network. As the angle $\theta$ is changed during modulation from the "carrier" angle of approximately 135°, the load seen by the power amplifier tubes will become a complex impedance, resulting in a circulating current common to the two tank circuits. The power input to the power amplifier tubes must thus increase to supply this reactive current, without an equivalent increase in the power output, so the conversion efficiency will deteriorate (depart) from that obtained at "carrier" level.

Examination of Equation 1 will show that this departure of the conversion efficiency is not large for the positive side of the modulation cycle, but that it is quite large for the negative side. On the positive side, the loss in conversion efficiency (compared to the efficiency at "carrier" level) is on the order of 5%. On the negative side of the modulation cycle, however, the power factor of the load that the power amplifier tubes see becomes so bad, due to detuning (as the angle $\theta$ changes), that the input will be relatively high, in fact the input may actually exceed that required to produce "carrier" power. At the same time, there is relatively low output power on this side of the modulation cycle, the power output dropping to zero at the extreme lower portion or trough of the modulation cycle. This characteristic of the modulation system has two detrimental aspects. It leads to a very low conversion efficiency under modulation (essentially zero at the extreme trough of modulation, where there is zero output power), and also to excessive plate dissipation in the output tubes, since the high input power does not result in output power and must therefore appear as plate dissipation in the power amplifier tubes.

There is still another detriment resulting from the application of constant driving voltage (during modulation) to the power amplifier tubes, as is done in the conventional "out-phasing" modulation system. On the negative peaks of modulation, the resistive portion of the anode load seen by the power amplifier or output tubes is also infinite, being limited only by the losses in the power amplifier anode tank circuits. This makes the total load impedance very much higher than at "carrier" level, so high, in fact, that with "carrier" level drive voltage on the grids of the power amplifier tubes, excessive RF voltages will be developed at the anodes. These voltages will in most cases exceed the D.C. anode voltage, and being limited only by the regulation provided through increased grid current (which provides regulation by diverting space current from the anode), may become destructive to tubes and/or circuit elements.

All of the above detriments or drawbacks of the conventional "out-phasing" modulation system can be minimized by modifying the driving voltage to the power amplifier or output tubes in accordance with the power output requirements over the modulation cycle. This modification of the driving voltage is effected by applying a modulation frequency voltage to the grids of the driver amplifiers 25 and 28, so as to produce phase modulated and amplitude modulated waves for application as driving voltages to the respective power amplifiers 26 and 29. The two driver amplifier tubes 25 and 28 are grid modulated in parallel, the amplitude modulation signal supplied to the drivers 25 and 28 being the same as that applied to the upper triad of phase modulators 12, 13, and 14, phased so that the modulation peaks in the driving voltage supplied to the power amplifiers 26 and 29 coincide with the modulation peaks in the amplitude modulated output signal.

It will now be explained, with reference to Fig. 1, how in effect the driving voltage supplied to the power amplifiers 26 and 29 is amplitude modulated, as well as phase modulated. Audio frequency intelligence (modulating signals) is supplied to the input of a two-stage modulation amplifier 31 from one of the push-pull outputs of preamplifier 15, by means of a coupling connected in parallel with the coupling which supplies modulating signals to phase modulators 12, 13, and 14. After amplification in amplifier 31, the audio frequency intelligence is applied to the input of a cathode follower amplifier stage 32 the output of which is fed in parallel (as denoted by "AM") to the grids of the two amplifiers 25 and 28 each of which operates as a grid modulated amplifier. Thus, modulation frequency signals are applied in phase to the grids of these two amplifiers, along with the phase modulated RF signals which are oppositely modulated in phase, the application of the modulation frequency signals being such that two phase modulated and amplitude modulated waves (denoted by "PM+AM") are produced for application as driving voltages to the respective power amplifiers 26 and 29. Therefore, amplified versions of the phase modulated and amplitude modulated waves appear at the outputs of the power amplifiers 26 and 29, for application to the combining network 30.

If sine wave modulation is assumed, then, in general, a sine wave of driving voltage of the proper amplitude and phase will provide the necessary drive over the modulation cycle, for the output (power amplifier) tubes 26 and 29. As previously described, the driving voltage necessary will be one modified in accordance with the power output requirements over the modulation cycle. That a sine wave of the proper amplitude and phase will provide the necessary drive can be shown best by examining three places on the modulation cycle, to wit, the "carrier" level, the peak, and the trough.

At "carrier" level, the output stages 26 and 29 are driven to, or slightly in excess of, grid current saturation. Bias in excess of anode current cutoff results in normal class C efficiency for the "carrier" level anode load.

At the peak of modulation, the impedance seen by the power amplifier tubes drops to one-fourth of that at "carrier." Consequently, unless much higher drive is supplied, the RF anode voltage developed across this lower impedance will drop, resulting in loss of efficiency and inability to achieve peak power. The increase in driving voltage is supplied by means of the amplitude modulation of the driving voltage, which provides an increased anode current through the anode load. This in turn tends to maintain constant the anode voltage, as required by the conventional phase-to-amplitude system of modulation.

At the trough or negative peak, the impedance seen by the power amplifier tubes will be very high, so high that with "carrier" level drive voltage on the power amplifier grids, excessive RF voltage will be developed at the anodes. Since no output power is required at the trough of modulation, no driving voltage or power will be required. However, this may be seen to be the condition resulting from amplitude modulation of the driving voltage applied to the power amplifiers 26 and 29.

The Chireix article referred to states that the conventional "out-phasing" modulation system is in reality load impedance modulation, wherein the load impedance of the output circuit is controlled during the modulation cycle. Such article also states that in such conventional system, the response to phase variations varies but little as long as $\theta$ is large. It follows then that considerable phase modulation is lost on the negative part of the modulation cycle, and over the greater part of the negative modulation the output tubes see a relatively constant load.

Therefore, the system of this invention operates somewhat as follows. From the "carrier" level downward toward the trough of modulation (that is, for the negative side of the modulation cycle), the operation is essentially conventional amplitude modulation, utilizing grid modulation (in driver amplifier tubes 25 and 28) followed by a linear amplifier (tubes 26 and 29). From the "carrier" level upward toward the peak of modulation (that is, for the positive side of the modulation cycle), the system operation is essentially conventional "out-phasing" modulation. Of course, there is no clear-cut line of demarcation between these two modes of operation, nor is there any region wherein one is operative to the absolute exclusion of the other.

In practice, the amount of modulation frequency signal supplied to drivers 25 and 28 from amplifier stage 32, to amplitude modulate the driving voltage for the power amplifier tubes, is adjusted so that positive and negative peaks of the amplitude modulated output signal are of equal amplitude. This can readily be done, because the driver amplitude modulation is effective essentially only for the negative side of the modulation cycle.

A modulation system according to the teachings of this invention has been built and successfully tested, in a 50-kw. broadcast transmitter. Using a system built and adjusted as described herein, with an amplitude modulated driving voltage applied to the power amplifier tubes, the improvement in average conversion efficiency is on the order of 12% (at 100% modulation), as compared to that obtained using unmodulated (i.e., without amplitude modulation) drive. At a 50-kw. power level, this results in a net saving in tube plate dissipation of about 30 kw., and an equal saving in power input, at 100% modulation. The conversion efficiency is substantially unaffected at "carrier" power level.

A further advantage is obtained with the system of this invention. In the instant system, it is not necessary to have absolute balance of the power phase difference at the trough of modulation, since the zero power output necessary for 100% modulation is obtained by "cutting off" the output tubes (that is, by removing the drive therefrom), rather than by balancing their respective outputs. Then, any small difference of outputs results only in an incidental phase modulation, and the balance criterion is then set by the allowable amount of this modulation.

Fig. 3 is a detailed schematic of one of the phase modulator-phase modulated amplifier combinations of Fig. 1, here illustrated as the first phase modulated amplifier 9 of the upper channel and its corresponding phase modulator 12. It is desired to be pointed out that all of the phase modulated amplifiers 9, 10, 11, 17, 18, and 19, together with their respective associated phase modulators 12, 13, 14, 20, 21, and 22 are of quite similar circuitry, so that a description of one phase modulated amplifier and its associated phase modulator will suffice.

RF signal from the fixed phase shift amplifier 5 appears on lead 7 and is applied through a D.C. blocking and RF coupling capacitor 33 to the control grid of pentode vacuum tube 9 operating as a phase modulated amplifier. A variable-resistance type of phase modulator is used, and for this an effective variable resistance is connected in series with a capacitor, and this series combination is connected across an inductance 34 in the anode circuit of tube 9. Capacitor 35 is the capacitor just referred to, and one side of this capacitor is connected to one end of inductor 34 and also to the anode of tube 9. The modulation process really consists of the injection of a variable resistance into the anode tank circuit of tube 9, in accordance with the modulation intelligence. This variable resistance is obtained through the use of a cathode follower type of phase modulator 12. The audio frequency intelligence (modulating signal) is applied by means of a coupling capacitor 36 to the grid of a triode electrode structure, which is preferably one-half of a twin triode, type 5692 tube. The variable resistance effect (in accordance with or in response to the modulating signal) appears across a resistor 37 connected between the cathode of tube 12 and ground, the lower side of capacitor 35 being connected to the ungrounded end of this resistor. Thus, capacitor 35 and resistor 37 are connected effectively in series across anode tank circuit inductance 34, since the lower end of inductance 34 is grounded for RF by means of a capacitor 38.

The variable resistance injected into the anode tank circuit of tube 9 causes phase modulation of the RF wave passing therethrough, and the phase modulated RF wave is taken off the upper end of inductance 34 and fed by way of a coupling capacitor 39 to the next following phase modulated amplifier 10.

Figure 4:
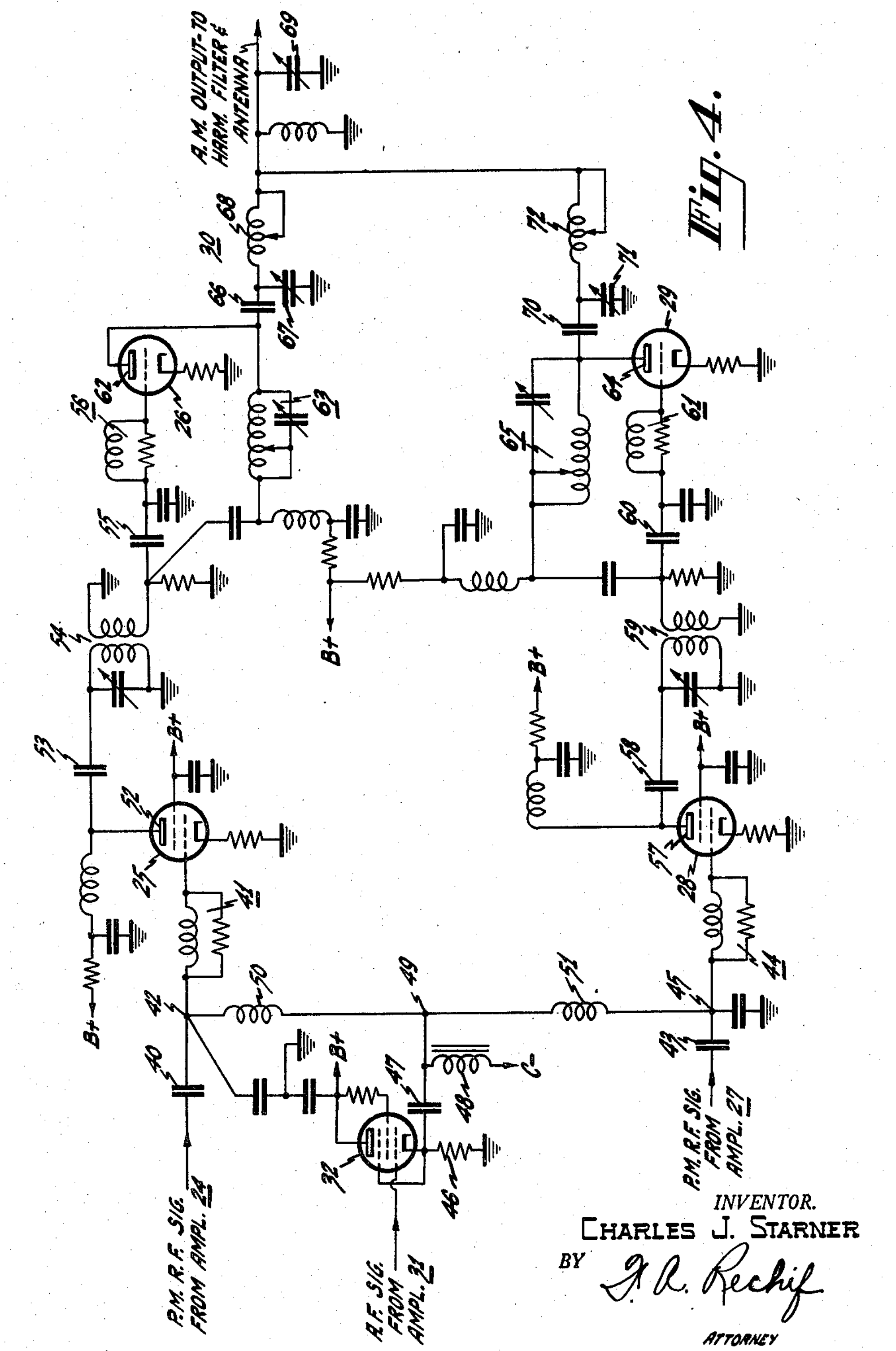
Fig. 4 is a detailed circuit diagram of the driver amplifier and power amplifier stages of the Fig. 1 transmitter.

Fig. 4 is a detailed schematic of the driver amplifier and power amplifier stages of Fig. 1. The phase modulated RF wave at the output of amplifier 24 (denoted in Fig. 1 by "PM 1") is fed through a coupling capacitor 40 and an inductance-resistance network 41 to the control grid of a tetrode vacuum tube 25 acting as the driver amplifier for channel No. 1. The junction of elements 40 and 41 is designated as point 42. Similarly, the phase modulated RF wave at the output of amplifier 27 (denoted in Fig. 1 by "PM 2") is fed through a coupling capacitor 43 and an inductance-resistance network 44 to the control grid of a tetrode vacuum tube 28 acting as the driver amplifier for channel No. 2. The junction of elements 43 and 44 is designated as point 45. Tubes 25 and 28 may be of the 6076 type, for example.

The amplified audio frequency modulating signal at the output of modulation amplifier 31 is fed to the control grid of a pentode vacuum tube 32 connected to operate as a cathode follower stage. Actually, the cathode follower stage 32 may comprise three type 807 tubes connected in parallel, but for purposes of simplicity only one of these tubes is shown in Fig. 4. Audio frequency modulating signals appear across a resistor 46 connected from the cathode of tube 32 to ground, and these modulating signals are coupled through a coupling capacitor 47, over a modulation reactor 48, to point 49.

In order to provide amplitude modulation of the driving voltage applied to power amplifier tubes 26 and 29, modulating signals are applied to the control grids of driver amplifiers 25 and 28, in such a way as to grid modulate these tubes, the application of these modulating signals to the driver amplifiers 25 and 28 being in parallel to the two control grids. Thus, from point 49 (a modulation frequency voltage point) a connection extends through an inductance or choke 50 to point 42 (the control grid connection for tube 25), while a parallel connection extends from point 49 through an inductance or choke 51 to point 45 (the control grid connection for tube 28). The lower end of modulation reactor 48 (that is, the end opposite to point 49) is connected to the negative terminal C— of a grid bias potential supply, so that grid bias modulation of the tubes 25 and 28 is effected in response to the modulation frequency signal across resistor 46. The modulating signals appearing across resistor 46 are derived from the preamplifier 15 by way of amplifier 31, so that the amplitude modulation signals applied to tubes 25 and 28 are derived from the same source as those applied to the phase modulators (such as 12 in Fig. 3).

Tubes 25 and 28 operate as grid modulated amplifiers. As a result of the grid bias modulation action taking place in tubes 25 and 28 (it will be remembered that phase modulated waves are applied to these same grids), a phase modulated and amplitude modulated wave is produced at the anode of each of the tubes 25 and 28, these waves are utilized as the driving voltages for the respective power amplifier tubes 26 and 29.

The wave appearing at anode 52 of tube 25 is applied through a coupling capacitor 53 to the primary winding of an RF transformer 54, and from the secondary of this transformer a connection extends through a coupling capacitor 55 and an inductance-resistance network 56 to the grid of a triode vacuum tube 26 operating as the power amplifier for channel No. 1. In this way, the phase modulated and amplitude modulated wave at anode 52 is applied as a driving voltage to tube 26. Similarly, the wave appearing at anode 57 of tube 28 is applied through a coupling capacitor 58 to the primary winding of an RF transformer 59, and from the secondary of this transformer a connection extends through a coupling capacitor 60 and an inductance-resistance network 61 to the grid of a triode vacuum tube 29 operating as the power amplifier for channel No. 2. In this way, the phase modulated and amplitude modulated wave at anode 57 is applied as a driving voltage to tube 29. Tubes 26 and 29 are preferably of the 5671 type.

The amplified phase modulated and amplitude modulated wave at the anode 62 of tube 26 appears across an anode tank circuit 63, which is an inductance-capacitance type of circuit and is individual to tube 26. The amplified phase modulated and amplitude modulated wave at the anode 64 of tube 29 appears across an anode tank circuit 65, which is an inductance-capacitance type of circuit and is individual to tube 29. The tank circuits 63 and 65 are the anode tank circuits of the power amplifier tubes, which are initially tuned to cancel out the plus or minus reactive portion of the load, at the "carrier" angle of approximately 135° between the outputs of power amplifiers 26 and 29.

The wave appearing across anode tank circuit 63 is coupled through a capacitor 66 to one side of the output (combining) network 30. Tube 26 has a more or less conventional pi-network type of output circuit, comprising an input shunt capacitive element 67 (which may be a variable vacuum capacitor), a series inductive element 68, and an output shunt capacitive element 69. The wave appearing across tank circuit 65 is coupled through a capacitor 70 to the other side of output (combining) network 30. Tube 29 has a more or less conventional pi-network type of output circuit, comprising an input shunt capacitive element 71 (which may be a variable vacuum capacitor), a series inductive element 72, and the shunt capacitive element 69.

It may thus be seen that the capacitive shunt element 69 is common to both power amplifier tubes, and that each tube has a pi-network type of output circuit. The two phase modulated and amplitude modulated waves (outputs of power amplifier tubes 26 and 29) are vectorially combined in the combining network 30, producing an amplitude modulated output wave across capacitor 69. This amplitude modulated output wave is the output of the system and is fed through a low pass filter (harmonic filter) to a transmitting antenna.

Each of the two networks 67, 68, 69 and 71, 72, 69 is set up as a 90° (impedance inverting) network, with the characteristic impedance required to convert the load (antenna) resistance to the value required for optimum operation of the respective power amplifier tube. Subsequent operational tuning is accomplished by adjusting each input shunt element (such as 67 and 71), to provide a non-reactive load for the respective power amplifier tube.

What is claimed is:

1. In a radio transmitter, a single source of carrier waves, phase splitting means coupled to said source for splitting said carrier waves into two portions having a predetermined phase difference therebetween, separate phase modulators operating on each portion for oppositely modulating the phases of said two portions in accordance with a modulating signal to produce two phase modulated waves, means for modulating the amplitudes of said two phase modulated waves in parallel relation in accordance with said modulating signal to produce two phase modulated and amplitude modulated waves, said last-named means operating to cause the amplitude modulation peaks in said last-named waves to coincide in time with the phase modulation speaks therein, and means for combining said two phase modulated and amplitude modulated waves.

2. In a radio transmitter, means for developing in each of two channels waves of a common carrier frequency, the waves in the two channels having a predetermined phase difference therebetween, separate phase modulators coupled to each channel for oppositely modulating the phases of said two waves in accordance with a modulating signal to produce two phase modulated waves, means for modulating in parallel relation the amplitudes of said two phase modulated waves in accordance with said modulating signal, thereby producing two phase modulated and amplitude modulated waves, said last-named means operating to cause the amplitude modulation peaks in said last-named waves to coincide in time with the phase modulation peaks therein, and means for combining said two phase modulated and amplitude modulated waves.

3. In a radio transmitter, a single source of carrier waves, phase splitting means coupled to said source for splitting said carrier waves into two portions having a predetermined phase difference therebetween, separate phase modulators operating on each portion for oppositely modulating the phases of said two portions in accordance with a modulating signal to produce two phase modulated waves, means for modulating in parallel relation the amplitudes of said two phase modulated waves in accordance with said modulating signal, thereby producing two phase modulated and amplitude modulated waves, and means for combining said two phase modulated and amplitude modulated waves.

4. In a radio transmitter, a single source of carrier waves, phase splitting means coupled to said source for splitting said carrier waves into two portions having a predetermined phase difference therebetween, separate phase modulators operating on each portion for oppositely modulating the phases of said two portions in accordance with a modulating signal to produce two phase modulated waves, means for modulating in parallel relation the amplitudes of said two phase modulated waves in accordance with said modulating signal to produce two phase modulated and amplitude modulated waves, said last-named means operating to cause the amplitude modulation peaks in said last-named waves to coincide in time with the phase modulation peaks therein, means for amplifying said last-named waves, and a network for combining said two phase modulated and amplitude modulated waves.

5. In a radio transmitter, means for developing in each of two channels waves of a common carrier frequency, the waves in the two channels having a predetermined phase difference therebetween, separate phase modulators coupled to each channel for oppositely modulating the phases of said two waves in accordance with a modulating signal to produce two phase modulated waves, means for modulating in parallel relation the amplitudes of said two phase modulated waves in accordance with said modulating signal, thereby producing two phase modulated and amplitude modulated waves, said last-named means operating to cause the amplitude modulation peaks in said last-named waves to coincide in time with the phase modulation peaks therein, means for amplifying said last-named waves, and a network for combining said two phase modulated and amplitude modulated waves.

6. In a radio transmitter, a single source of carrier waves, phase splitting means coupled to said source for splitting said carrier waves into two portions having a predetermined phase difference therebetween, separate phase modulators operating on each portion for oppositely modulating the phases of said two portions in accordance with a modulating signal to produce two phase modulated waves, means for modulating in parallel relation the amplitudes of said two phase modulated waves in accordance with said modulating signal, thereby producing two phase modulated and amplitude modulated waves, means for amplifying said last-named waves, and a network for combining said two phase modulated and amplitude modulated waves.

7. The method of modulation of carrier wave energy in accordance with modulation current of complex wave form characteristic of signals which includes the steps of separating said carrier wave energy into two portions in phase displaced relation, varying the phases of said two portions in opposite senses in accordance with the modulation current amplitude, thereafter varying the amplitudes of said two portions in accordance with the modulation current, and combining said two portions as so modified to provide a resultant.

8. The method of modulation of carrier wave energy in accordance with modulation current of complex wave form characteristic of signals which includes the steps of separating said carrier wave energy into two portions in phase displaced relation, varying the phases of said two portions in opposite senses in accordance with the modulation current amplitude, thereafter varying the amplitudes of said two portions in the same sense in accordance with the modulation current, and combining said two portions as so modified to provide a resultant.

9. The method of modulation of carrier wave energy in accordance with modulation current of complex wave form characteristic of signals which includes the steps of separating said carrier wave energy into two portions in phase displaced relation, varying the phases of said two portions in accordance with the modulation current amplitude, thereafter varying the amplitudes of said two portions in accordance with the modulation current, and vectorially combining said two portions as so modified to provide a resultant amplitude modulated wave.

References Cited in the file of this patent

UNITED STATES PATENTS

| | | |
|---|---|---|
| 1,946,308 | Chireix | Feb. 6, 1934 |
| 2,614,246 | Dome | Oct. 14, 1952 |
| 2,624,041 | Evans | Dec. 30, 1952 |